Patented Apr. 24, 1923.

1,452,898

UNITED STATES PATENT OFFICE.

JOHN BLEWETT SMYTH, OF BEAUMONT, TEXAS.

PROCESS OF TREATING ROCK ASPHALT.

No Drawing.   Application filed April 24, 1920.   Serial No. 376,376.

*To all whom it may concern:*

Be it known that I, JOHN BLEWETT SMYTH, a citizen of the United States, residing at Beaumont, in the county of Uvalde and State of Texas, have invented certain new and useful Improvements in Processes of Treating Rock Asphalt; and I do hereby declare the following to be a full, clear, and exact description of the invention, such as will enable others skilled in the art to which it appertains to make and use the same.

This invention appertains to a composition of matter having all the valuable properties of European mastic; and possessing superior characteristics in its susceptibility of being worked and applied more quickly and without the application of heat. Its utility extends to purposes of insulation, water proofing, roofing, flooring, linings for reservoirs for holding water or acids; and it is eminently useful for paving purposes, owing to its durability, its wear and shock absorbing qualities, its water and acid proof characteristics and its persistence in sanitary condition. The composition is a solid material, dark grey in color, tough and somewhat flexible. It fractures only at low temperatures and does not soften materially under a temperature of 170° F.

The invention more particularly relates to the process of manufacture of the said product, said process involving suitable treatment of a natural substance, consisting of a bitumen or asphalt mechanically combined with or contained in certain porous limestones and sandstones, with a mineral oil containing approximately 50% asphalt. Asphaltic or bitumen containing rock of approximately similar structure and composition has for a great many years been highly prized in some parts of the world for paving or road surfacing purposes and has been deemed to be the very best paving material ever known. So far as I am aware paving compositions derived from such materials have heretofore required most careful heating before it has been possible to compress it into sheets or blocks. It has also required softening or fluxing to prevent cracking; and the desired result hitherto has been effected by slow and expensive heating, mixing a flux with the substance while hot, and compressing while hot.

It is an object of this invention to produce a substance having, among others, the valuable properties recited, from a porous naturally occurring rock partially saturated or impregnated with bitumen, by a process of granulating and treating, at normal atmospheric temperatures, with an asphaltic oil to quickly condition the mass into a workable plastic suitable for the stated and other uses.

The material that I have used with most gratifying results is a natural deposit, occurring in large quantities in Uvalde County, Texas, of shell limestone composed largely of the shells of minute organisms with occasional remains of shells of large molluscs, and a proportion of calcite, the rock having a large percentage of interstices, pores and cavities, sometimes exceeding in volume the solid portions, the pores and cavities being partially but never completely filled with bitumen. Analysis shows that this material contains on an average about 15% of asphalt, by weight. Owing to the nature of this rock and its lack of homogeneous structure it has been an unsatisfactory raw material to work into products for paving purposes without the application of heat prior to my invention.

In practice I have found that about four gallons of asphaltic oil applied in the manner hereinafter described, is a suitable quantity of solvent oil for the treatment of one ton of granulated rock containing approximately 15% bitumen. This proportion may be stated in another way, as hereinafter, as requiring the use of six gallons of oil to the cubic yard of rock, the specific gravity of the natural rock being approximately 2.1.

I have evolved a process of forcing the bitumen further into the unfilled cavities of the described rock, thereby increasing the specific gravity, which is a measure of the extent to which the rock is impregnated, and produced a mastic that has stability, superior strength and sufficient resiliency to resist shocks and sudden changes of temperature, properties not characteristic of the natural rock. I have further developed a process for producing said mastic by which I am enabled to cause cohesion of granulated portions of the rock when pulverized and have conditioned the pulverized product so that it may be conveniently handled by unskilled laborers with shovels. I have discovered a process by which the product can be made without application of heat.

In my first experiments I cascaded the pulverized rock in a revolving drum and applied heat to the granular material while it was being so cascaded, of such temperature as not to melt the asphalt or bitumen in the granules, and only of sufficient degree to soften the exterior parts of the included asphalt or bitumen to an extent to cause a cohesion and flow of the bitumen in the interstices when the material was subjected to pressure, aided by a solvent for the bitumen, the heat being insufficient to soften the exterior of said bitumen without the aid of the solvent. I discovered in these experiments that a solvent carrying asphalt or bitumen of a quantity about equal to the quantity of solvent would accomplish the softening in conjunction with the low heat and at the same time would provide additional bitumen so that the bitumen in the rock itself and the bitumen carried with the solvent, and the solvent, would permeate the unfilled interstices of the rock and effect the desired results, that is to say, the softening of the surface of the bitumen, filling of the unfilled interstices, providing for cohesion and for the absorption of the solvent in the interstices in the hardening of the mastic. I further discovered that by regulating the pressure in compressing this pulverized mass relative to the amount of solvent, the size of the granules, the amount of heat and the amount of added bitumen, I could provide a mastic of any desired specific gravity or resiliency, stability and strength, to care for varying conditions and uses of the product.

I further discovered a natural oil which contained the requisite proportions of a solvent and bitumen; namely an asphaltic oil obtained from petroleum and containing about 30% to 50% asphalt. For purposes of identification the said oil may be described as having a specific gravity of 10° to 16° Beaumé; a flash point not under 40° C.; loss at 163° C., 5 hours, not over 40%; asphalt content 30% or over, 95% or more being soluble in carbon bisulphide. The said natural oil is the asphaltic oil that I prefer to use, although it is proable that the purpose thereof is susceptible of achievement with other hydro-carbon products of similar composition.

I subsequently developed this process to the final stage whereby I am able to soften and work the materials without the application of heat. In my fully developed process I use an ordinary mixing drum, similar to a concrete mixer, having internal flights, with the proper power for revolving; a small rotary chain or belt driven pump capable of working against a back pressure of fifty or more pounds per square inch, and a sprayer; a weighing or measuring bin for the crushed bituminous or asphaltic rock and a measuring tank for oil. The proper proportion of crushed rock is determined by weighing or measuring and placed in the revolving drum. The oil, six gallons per cubic yard, is measured in the measuring tank, which is connected to the pump by a pipe line. The pump is started and the oil is pumped through the sprayer directly onto the bituminous rock while it is being cascaded from the flights in the drum as the latter revolves, thus accomplishing a perfect distribution of the oil through the entire mass, a result impossible of achievement with ordinary mixing methods.

It is not possible to mix the two substances thoroughly by placing the bituminous rock in the drum and pouring in the oil, as in the usual method of mixing, because six gallons of oil poured in would not distribute through one cubic yard of bituminous rock, and would only moisten a few cubic feet of the granular mass causing that portion to ball up in a sticky mass, leaving the balance dry and unfluxed; if sufficient oil were added to coat all of the particles of the mass about three times the amount of oil necessary would be required and the product would be too soft for use.

By my improved process the asphaltic oil combines with the outer or exposed portions of the bitumen in every granule of the rock and softens it, making the mass evenly sticky.

It should be noted that the character and amount of the solvent oil used is such that the granular particles are so lightly coated that they are not dissolved to the extent of preventing ready spreading and distribution of the composition on the street or roadway; nor is the amount of solvent oil used so great that it constitutes a liquid vehicle in which comminuted particles are suspended as a fluid mass; the composition before compression being at all times in a more or less dry and pulverulent or granular condition and capable, through the solvent action of the oil, of becoming agglomerated after compression into a strong coherent mass.

When compressed, the product solidifies and forms an exceedingly tough and durable substance. It is manufactured and handled cold, thus avoiding the usual dangers to asphaltic compositions from over heating. It hardens quickly after exposure to the atmosphere; the saving in time, labor and fuel is therefore great. When laid as a pavement and once rolled it is ready at once for traffic. It will not crack under any changes of atmospheric temperature. Because of the stated properties it is obviously a most valuable material for paving.

Claims:

1. A process of treating porous rock, the pores of which are partially filled with hard asphaltic material, said process consisting in comminuting said rock, thoroughly disseminating, throughout a mass of the comminuted rock, only sufficient solvent of the asphaltic material to soften the surface of said material to such an extent that the particles may be kneaded together, and to fill the voids in the pores of the rock not occupied by said asphaltic material.

2. A process of preparing a bituminous composition which consists in comminuting rock containing hard asphaltic material, thoroughly disseminating throughout a mass of said comminuted rock while in a cold state only sufficient solvent of the hard asphaltic material to produce superficial softening thereof, compressing the mixture thus formed and allowing the solvent to flux the asphaltic constituent.

3. The process which consists of selecting a mass of comminuted porous rock the pores of which contain a soluble plastic, cascading or showering a mass of said comminuted rock, and forcibly injecting into the mass that is in the state of cascading or showering a finely divided spray of a solvent of said plastic.

4. The process of preparing a bituminous composition which consists of comminuting bituminous rock, spraying and mixing said rock with a solvent of bitumen while the rock is being cascaded in a cold condition; the solvent spray being directed against that portion of the rock which is in the state of being cascaded, the amount and proportion of solvent oil being such as to result in a granular composition capable of being spread while cold and solidifying into a coherent mass upon compression.

5. A process consisting of comminuting a calcareous, porous rock, the pores of which contain solid asphaltic material, which consists in showering or cascading a mass of the comminuted rock in a cold condition and forcibly injecting into the mass of comminuted rock that is in the state of being cascaded or showered a finely divided spray of a solvent of asphalt.

6. A process which consists in comminuting a calcareous rock having pores or other cavities partially filled with asphaltic material, which consists in cascading or showering a mass of said comminuted rock and forcibly injecting into the cascading or showering mass a finely divided spray of a solvent of asphalt including sufficient asphaltic material to fill the voids in the cavities of said rock not occupied by the original asphaltic material.

7. The process of preparing a bituminous composition which consists in comminuting rock containing hard asphalt, spraying said rock while cold with a solvent for bitumen, regulating the character and amount of solvent so as to produce superficial softening only of the bituminous constituents of the rock.

8. The process of preparing a bituminous composition which consists in comminuting rock containing hard asphalt, spraying said rock while cold with a solvent for bitumen, regulating the character and amount of solvent so as to produce superficial softening only of the bituminous constituents of the rock, and compressing the granular composition thus formed and allowing the solvent oil to flux the bituminous constituents of the rock.

9. The process which consists in comminuting a porous rock containing asphaltic material in its pores or cavities; moistening the particles of the mass of said comminuted rock while it is in a cold state with a solvent of asphalt, the quantity of solvent used being only sufficient to soften the asphaltic material to an extent such that the particles may be kneaded together.

10. The process which consists of selecting a mass of comminuted porous rock containing approximately 15% asphaltic material partially filling the pores or cavities thereof; and thoroughly disseminating throughout said mass a mineral oil containing from 30% to 50% asphalt, using approximately four gallons of oil to one ton of comminuted rock.

In testimony whereof I affix my signature.

JOHN BLEWETT SMYTH.